(12) United States Patent
Niu et al.

(10) Patent No.: US 10,778,120 B2
(45) Date of Patent: Sep. 15, 2020

(54) METHOD, CIRCUIT AND APPARATUS FOR ENERGY MANAGEMENT IN TRIBOELECTRIC NANOGENERATOR

(71) Applicant: BEIJING INSTITUTE OF NANOENERGY AND NANOSYSTEMS, Beijing (CN)

(72) Inventors: Simiao Niu, Beijing (CN); Xiaofeng Wang, Beijing (CN); Zhonglin Wang, Beijing (CN)

(73) Assignee: BEIJING INSTITUTE OF NANOENERGY AND NANOSYSTEMS, Beijing (CN)

( * ) Notice: Subject to any disclaimer, the term of this patent is extended or adjusted under 35 U.S.C. 154(b) by 334 days.

(21) Appl. No.: 15/769,605

(22) PCT Filed: Oct. 18, 2016

(86) PCT No.: PCT/CN2016/102452
§ 371 (c)(1),
(2) Date: Apr. 19, 2018

(87) PCT Pub. No.: WO2017/067446
PCT Pub. Date: Apr. 27, 2017

(65) Prior Publication Data
US 2018/0316280 A1    Nov. 1, 2018

(30) Foreign Application Priority Data
Oct. 19, 2015    (CN) .......................... 2015 1 0679832

(51) Int. Cl.
*H02J 7/04*    (2006.01)
*H02N 1/04*    (2006.01)
(Continued)

(52) U.S. Cl.
CPC .................. *H02N 1/04* (2013.01); *H02J 7/00* (2013.01); *H02M 3/00* (2013.01); *H02J 7/345* (2013.01); *H02J 2207/20* (2020.01)

(58) Field of Classification Search
CPC .. H02J 7/022; H02J 7/0093; H02J 2007/0059; H02J 7/0068; H01M 10/44
See application file for complete search history.

(56) References Cited

U.S. PATENT DOCUMENTS

2005/0077909 A1* 4/2005 Lalla ........................ G01D 5/24
324/658
2006/0240291 A1* 10/2006 Kim .................. H01M 8/04917
429/9
(Continued)

FOREIGN PATENT DOCUMENTS

CN         201332281 Y       10/2009
CN         104393658 A       3/2015
(Continued)

OTHER PUBLICATIONS

Notification of Reason for Refusal and English language translation, KR Application No. 10-2018-7013801, dated Aug. 29, 2019, 7 pp.
(Continued)

*Primary Examiner* — Arun C Williams
(74) *Attorney, Agent, or Firm* — Myers Bigel, P.A.

(57) ABSTRACT

The present disclosure relates to nanogenerator technology, and discloses a method and a circuit for energy management in a Triboelectric Nanogenerator (TENG), as well as an apparatus including the circuit. The method includes: storing electrical energy outputted from the TENG temporarily in a temporary energy storage; and transferring the electrical energy stored temporarily in the temporary energy storage to an energy storage. With the above solution, the temporary energy storage can be charged and discharged periodically, so as to charge the energy storage. It is possible to achieve (Continued)

impedance match between the TENG and the energy storage and thus a significantly improved energy storage efficiency, such that an AC outputted from the TENG can be converted into a constant-voltage DC output efficiently.

16 Claims, 3 Drawing Sheets

(51) Int. Cl.
*H02M 3/00* (2006.01)
*H02J 7/00* (2006.01)
*H02J 7/34* (2006.01)

(56) References Cited

U.S. PATENT DOCUMENTS

| | | | |
|---|---|---|---|
| 2011/0050181 A1 | 3/2011 | Post et al. | |
| 2015/0123481 A1* | 5/2015 | Reihlen | H02J 7/0024 307/80 |
| 2016/0049821 A1* | 2/2016 | Aridome | B60L 53/60 320/128 |

FOREIGN PATENT DOCUMENTS

| | | |
|---|---|---|
| CN | 204349598 U | 5/2015 |
| CN | 104767376 | 7/2015 |
| CN | 104811085 A | 7/2015 |
| CN | 104901385 A | 9/2015 |
| EP | 1050955 A1 | 11/2000 |
| JP | 2014169054 | 9/2014 |
| JP | 2014529292 | 10/2014 |
| WO | 2013055238 | 4/2013 |
| WO | 2013/132441 A2 | 9/2013 |

OTHER PUBLICATIONS

Jia, "Highly Integrated Dc-dc Converters", Electronic Theses and Dissertations. 4225, Univ. of Central Florida, May 31, 2010, 126 pp.
International Search Report and Written Opinion of the International Searching Authority corresponding to International Patent Application No. PCT/CN2016/102452 dated Dec. 30, 2016 (17 pages).
Communication with Supplementary European Search Report, EP Application No. 16856877.2, dated May 29, 2019, 9 pp.
Adami et al., "Self-Powered Ultra-low Power DC-DC Converter for RF Energy Harvesting", 2012 IEEE Faible Tension Faible Consommation, Jun. 1, 2012, 4 pp.
Notification of Reasons for Refusal corresponds to Japanese Patent Application No. 2018-521021 dated Feb. 20, 2019. (7 pages with English Translation).

* cited by examiner

METHOD, CIRCUIT AND APPARATUS FOR ENERGY MANAGEMENT IN TRIBOELECTRIC NANOGENERATOR

CROSS-REFERENCE TO RELATED APPLICATIONS

This application is a 35 U.S.C. § 371 national stage application of PCT Application No. PCT/CN2016/102452, filed on Oct. 18, 2016, which itself claims priority from Chinese Patent Application No. 201510679832.5, filed on Oct. 19, 2015, the contents of all of which are incorporated herein by reference in their entireties. The above-referenced PCT International Application was published as International Publication No. WO 2017/067446 A1 on Apr. 27, 2017.

TECHNICAL FIELD

The present disclosure relates to nanogenerator technology, and more particularly, to a method and a circuit for energy management in a Triboelectric Nanogenerator (TENG), as well as an apparatus including the circuit.

BACKGROUND

With the rapid development of nanogenerators based on triboelectric effect since 2012, there is now a promising way of converting mechanical energy into electrical energy for driving electronic devices. However, due to a high internal impedance in a conventional TENG, it is likely that there would be an impedance mismatch with an energy storage element. Hence, such TENG utilizing a conventional energy storage technique that first rectifies a voltage and then stores the rectified voltage in the energy storage element has very low energy storage efficiency. An experiment has shown that its energy storage efficiency is smaller than 1%, with a large amount of energy wasted.

There is no effective solution to the above problem in the related art.

SUMMARY

The embodiments of the present disclosure provide a method and a circuit for energy management in a TENG, as well as an apparatus including the circuit.

In an aspect of the present disclosure, a method for energy management in a Triboelectric Nanogenerator (TENG) is provided. The method includes: storing electrical energy outputted from the TENG temporarily in a temporary energy storage; and transferring the electrical energy stored temporarily in the temporary energy storage to an energy storage.

Further, the operation of storing the electrical energy outputted from the TENG temporarily in the temporary energy storage can include: converting Alternate Current (AC) electrical energy outputted from the TENG into Direct Current (DC) for storing temporarily in the temporary energy storage.

Further, the method can include: transferring the electrical energy stored temporarily in the temporary energy storage to the energy storage using a DC-DC converter which is a non-isolated DC-DC converter or an isolated DC-DC converter.

Further, the isolated DC-DC converter can include: a first switch; a first inductor being connectable in parallel with the temporary energy storage via the first switch; a second switch; and a second inductor being connectable in parallel with the energy storage via the second switch. The first inductor and the second inductor form mutual inductance.

Further, the method can include: transferring the electrical energy to the energy storage when a voltage of the electrical energy stored temporarily in the temporary energy storage reaches a first predetermined value.

Further, the method can include: stopping, when transferring the electrical energy from the temporary energy storage to the energy storage, transferring the electrical energy to the energy storage when the voltage of the electrical energy stored temporarily in the temporary energy storage reaches a second predetermined value.

Further, the method can include: turning off the first switch and the second switch before the voltage of the electrical energy stored temporarily in the temporary energy storage reaches the first predetermined value; turning on the first switch when the voltage of the electrical energy stored temporarily in the temporary energy storage reaches the first predetermined value, such that the electrical energy is transferred from the temporary energy storage to the first inductor; and turning off the first switch and turning on the second switch when the voltage of the electrical energy stored temporarily in the temporary energy storage reaches the second predetermined value, such that the electrical energy is transferred from the first inductor to the energy storage via the second inductor.

Further, the second switch can be turned off again after the electrical energy has all been transferred from the second inductor to the energy storage.

Further, the second predetermined value can be smaller than or equal to the first predetermined value.

Further, the first predetermined value can range from 15V to 1000V.

Further, the temporary energy storage can be a capacitor of 1 pF-1 mF.

Further, the temporary energy storage can be a battery. A square-wave clock signal can be generated by a control circuit for controlling on time of the first switch and/or the second switch. The first switch and the second switch can be both off when an output signal from the control circuit is at a low level. The first switch can be turned on when the output signal from the control circuit is at a high level, such that the electrical energy is transferred from the temporary energy storage to the first inductor. The first switch can be turned off and the second switch can be turned on when the output signal from the control circuit changes from the high level back to the low level, such that the electrical energy is transferred from the first inductor to the energy storage via the second inductor.

Further, the temporary energy storage can include at least a battery, and can have a total voltage of 10V-500V, an internal resistance smaller than or equal to 1 MΩ and a leakage current smaller than or equal to 10 mA.

Further, the voltage of the temporary energy storage can be higher than that of the energy storage by a factor of 3-1000.

Further, the first inductor and the second inductor can have a mutual inductance coefficient larger than 0.5, an inductance larger than or equal to 10 nH each, and a parasitic resistance smaller than or equal to 1 MΩ each.

Further, the energy storage can be a rechargeable battery or capacitor having an internal resistance smaller than or equal to 1 MΩ and a leakage current smaller than or equal to 100 mA.

In another aspect of the present disclosure, a circuit for energy management in a Triboelectric Nanogenerator (TENG) is provided. The circuit includes a first stage of circuit and a second stage of circuit connected in parallel with the TENG sequentially. The first stage of circuit includes a temporary energy storage. The second stage of circuit includes a DC-DC converter and an energy storage connected in parallel with each other. The DC-DC converter is configured to transfer electrical energy stored temporarily in the temporary energy storage to the energy storage.

Further, the first stage of circuit can further include a rectifier configured to rectify electrical energy outputted from the TENG into DC for providing to the temporary energy storage.

Further, the DC-DC converter can be a non-isolated DC-DC converter or an isolated DC-DC converter.

Further, the isolated DC-DC converter can include: a first switch; a first inductor being connectable in parallel with the temporary energy storage via the first switch; a second switch; and a second inductor being connectable in parallel with the energy storage via the second switch. The first inductor and the second inductor form mutual inductance.

Further, the DC-DC converter can be configured to transfer the electrical energy stored temporarily in the temporary energy storage to the energy storage when a voltage of the electrical energy stored temporarily in the temporary energy storage reaches a first predetermined value.

Further, the DC-DC converter can be configured to stop, when transferring the electrical energy, transferring the electrical energy to the energy storage when the voltage of the electrical energy stored temporarily in the temporary energy storage reaches a second predetermined value.

Further, the first switch and the second switch can be both turned off before the voltage of the electrical energy stored temporarily in the temporary energy storage reaches the first predetermined value. The first switch can be turned on when the voltage of the electrical energy stored temporarily in the temporary energy storage reaches the first predetermined value, such that the electrical energy is transferred from the temporary energy storage to the first inductor. The first switch can be turned off and the second switch can be turned on when the voltage of the electrical energy stored temporarily in the temporary energy storage reaches the second predetermined value, such that the electrical energy is transferred from the first inductor to the energy storage via the second inductor.

Further, the second switch can be turned off again after the electrical energy has all been transferred from the second inductor to the energy storage.

Further, the second predetermined value can be smaller than or equal to the first predetermined value.

Further, the first predetermined value can range from 15V to 1000V.

Further, the temporary energy storage can be a capacitor of 1 pF-1 mF.

Further, the temporary energy storage can be a battery. A square-wave clock signal can be generated by a control circuit for controlling on time of the first switch and/or the second switch. The first switch and the second switch can be both off when an output signal from the control circuit is at a low level. The first switch can be turned on when the output signal from the control circuit is at a high level, such that the electrical energy is transferred from the temporary energy storage to the first inductor. The first switch can be turned off and the second switch can be turned on when the output signal from the control circuit changes from the high level back to the low level, such that the electrical energy is transferred from the first inductor to the energy storage via the second inductor.

Further, the temporary energy storage can include at least a battery, and can have a total voltage of 10V-500V, an internal resistance smaller than or equal to 1 MΩ and a leakage current smaller than or equal to 10 mA.

Further, the voltage of the temporary energy storage can be higher than that of the energy storage by a factor of 3-1000.

Further, the first inductor and the second inductor can have a mutual inductance coefficient larger than 0.5, an inductance larger than or equal to 10 nH each, and a parasitic resistance smaller than or equal to 1 MΩ each.

Further, the energy storage can be a rechargeable battery or capacitor having an internal resistance smaller than or equal to 1 MΩ and a leakage current smaller than or equal to 100 mA.

Further, the first switch and the second switch can be both electronic switches.

In yet another aspect of the present disclosure, an apparatus for energy management in a Triboelectric Nanogenerator (TENG) is provided. The apparatus includes the above circuit.

With the above solution, the temporary energy storage can be charged and discharged periodically, so as to charge the energy storage. It is possible to achieve impedance match between the TENG and the energy storage and thus a significantly improved energy storage efficiency, such that an AC outputted from the TENG can be converted into a constant-voltage DC output efficiently.

The other features and advantages of the present disclosure will be described in detail below with reference to the embodiments.

BRIEF DESCRIPTION OF THE DRAWINGS

The figures, which constitute a part of the description, are provided for facilitating further understanding of the present disclosure in conjunction with the embodiments, rather than limiting the present disclosure. In the figures.

DETAILED DESCRIPTION

In the following, the embodiments of the present disclosure will be described in detail with reference to the drawings. It should be noted that the following embodiments are illustrative and explanatory only, rather than limiting the scope of the present disclosure.

Figure 1:
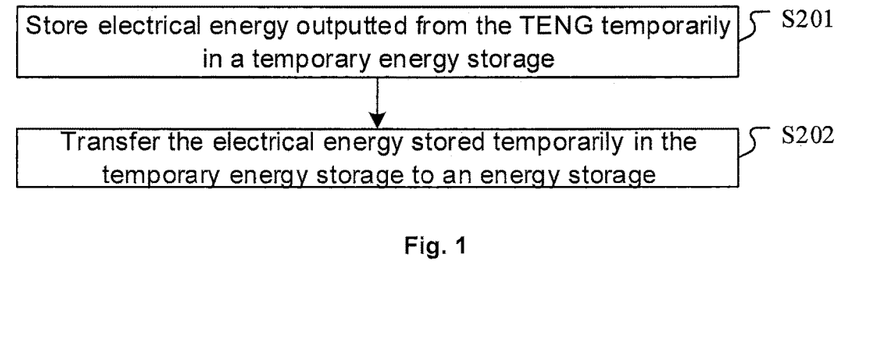
FIG. 1 is a flowchart illustrating a method for energy management in a TENG according to an embodiment of the present disclosure.

FIG. 1 is a flowchart illustrating a method for energy management in a TENG according to an embodiment of the present disclosure. As shown in FIG. 1, in another aspect of the present disclosure, a method for energy management in a TENG is provided. The method includes: at S201, storing electrical energy outputted from the TENG temporarily in a temporary energy storage; and, at S202, transferring the electrical energy stored temporarily in the temporary energy storage to an energy storage.

When the electrical energy outputted from the TENG is AC, the step S201 in which the electrical energy outputted from the TENG is stored temporarily in the temporary energy storage can include: converting AC electrical energy outputted from the TENG into DC for storing temporarily in the temporary energy storage.

In an embodiment, the method can include: transferring the electrical energy to the energy storage when a voltage of the electrical energy stored temporarily in the temporary energy storage reaches a first predetermined value. Further, the method can include: stopping, when transferring the electrical energy from the temporary energy storage to the energy storage, transferring the electrical energy to the energy storage when the voltage of the electrical energy stored temporarily in the temporary energy storage reaches a second predetermined value.

In an embodiment, the method can include: transferring the electrical energy stored temporarily in the temporary energy storage to the energy storage using a DC-DC converter (e.g., a non-isolated DC-DC converter or an isolated DC-DC converter). Here, the isolated DC-DC converter can include: a first switch; a first inductor being connectable in parallel with the temporary energy storage via the first switch; a second switch; and a second inductor being connectable in parallel with the temporary energy storage via the second switch. The first inductor and the second inductor form mutual inductance.

In an embodiment, the method can include: turning on the first switch when the voltage of the electrical energy stored temporarily in the temporary energy storage reaches the first predetermined value, such that the electrical energy is transferred from the temporary energy storage to the first inductor; and turning off the first switch and turning on the second switch when the voltage of the electrical energy stored temporarily in the temporary energy storage reaches the second predetermined value, such that the electrical energy is transferred from the first inductor to the energy storage via the second inductor. Then, after the electrical energy has all been transferred from the second inductor to the energy storage, the second switch is turned off again. In a preferred embodiment, before the voltage of the electrical energy stored temporarily in the temporary energy storage reaches the first predetermined value, the first switch and the second switch are both off.

The method for energy management according to the embodiment of the present disclosure can be divided into a number of periods each including two-step management. In the first step, the TENG charges the temporary energy storage (e.g., a temporary storage capacitor $C_{temp}$) via a rectifier circuit. In the second step, when a voltage of the temporary storage capacitor $C_{temp}$ reaches a predetermined value $V_1$, the energy in the temporary storage capacitor is transferred to the final energy storage $C_{store}$. Then, the temporary storage capacitor is discharged. Afterwards, the next charging period starts when the voltage of the temporary storage capacitor reaches $V_2 (V_2 \leq V_1)$, in which the TENG continues charging the temporary storage capacitor and then the energy in the temporary storage capacitor continues to be transferred to the final energy storage element.

Figure 2:
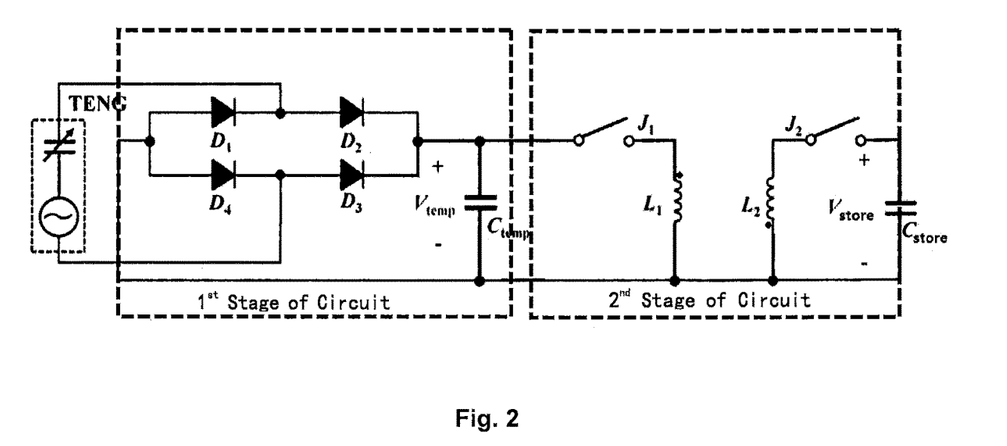
FIG. 2 is a schematic diagram showing a structure of a circuit for energy management in a TENG according to an embodiment of the present disclosure.

FIG. 2 is a schematic diagram showing a structure of a circuit for energy management in a TENG according to an embodiment of the present disclosure. As shown in FIG. 2, in yet another aspect of the present disclosure, a circuit for energy management in a TENG is provided. The circuit includes two stages of circuits. A first stage of circuit includes a temporary energy storage and a second stage of circuit is provided for efficient energy transfer from a temporary storage capacitor to a final energy storage element.

The first stage of circuit and the second stage of circuit are connected in parallel with the TENG sequentially. Here, the first stage of circuit includes a temporary energy storage (e.g., a temporary storage capacitor $C_{temp}$). The second stage of circuit includes a DC-DC converter and an energy storage (e.g., a rechargeable battery or a capacitor $C_{store}$) connected in parallel with each other. The first stage of circuit can further include a rectifier configured to rectify electrical energy outputted from the TENG into DC for providing to the temporary energy storage.

Here, the DC-DC converter is configured to transfer electrical energy stored temporarily in the temporary energy storage to the energy storage. The DC-DC converter can be a non-isolated DC-DC converter or an isolated DC-DC converter.

In an embodiment, when a voltage of the electrical energy stored temporarily in the temporary energy storage reaches a first predetermined value, the electrical energy stored temporarily in the temporary energy storage is transferred to the energy storage. In a further embodiment, the DC-DC converter can be configured to stop, when transferring the electrical energy, transferring the electrical energy to the energy storage when the voltage of the electrical energy stored temporarily in the temporary energy storage reaches a second predetermined value. Here, the DC-DC converter can include: a first switch $J_1$; a first inductor $L_1$ being connectable in parallel with the temporary energy storage via the first switch $J_1$; a second switch $J_2$; and a second inductor $L_2$ being connectable in parallel with the energy storage via the second switch $J_2$. The first inductor $L_1$ and the second inductor $L_2$ form mutual inductance.

In an embodiment, the first switch $J_1$ and the second switch $J_2$ can be both off before the voltage of the electrical energy stored temporarily in the temporary energy storage reaches the first predetermined value, so as to charge the energy storage quickly. The first switch $J_1$ can be turned on when the voltage of the electrical energy stored temporarily in the temporary energy storage reaches the first predetermined value, such that the electrical energy is transferred from the temporary energy storage to the first inductor $L_1$. The first switch $J_1$ can be turned off and the second switch $J_2$ can be turned on when the voltage of the electrical energy stored temporarily in the temporary energy storage reaches the second predetermined value, such that the electrical energy is transferred from the first inductor $L_1$ to the energy storage via the second inductor $L_2$.

In an embodiment, as shown in FIG. 2, the TENG charges the temporary storage capacitor $C_{temp}$ (which can be a 500 nF capacitor) via a full bridge rectifier composed of four diodes $D_1$-$D_4$. The DC-DC converter in the second stage of circuit can be a combination of two electronic switches $J_1$ and $J_2$ and a mutual inductance (e.g., a primary stage is the inductor $L_1$ and a secondary stage is the inductor $L_2$).

Additionally, a control circuit is provided for controlling the two electronic switches $J_1$ and $J_2$.

The temporary storage capacitor can have a value range of 1 pF-1 mF. The final energy storage can be selected from a rechargeable battery (including a Lithium-ion battery or a Ni-MH rechargeable battery), a super capacitor and an ordinary capacitor (including a ceramic capacitor or an electrolytic capacitor), and can have an internal resistance smaller than or equal to 1 MΩ and a leakage current smaller than or equal to 100 mA.

As the rectifier in the first stage of circuit, a full wave diode bridge rectifier or a half wave bridge rectifier can be used.

The DC-DC converter in the second stage of circuit can include a non-isolated DC-DC converter (including a buck chopper, a boost chopper, or a buck/boost chopper) and an isolated DC-DC converter (including a forward converter, a flyback converter, a half bridge converter, a full bridge converter or a push-pull converter).

The electronic switches in the DC-DC converter can include switch elements such as transistors (including various field effect transistors or bipolar transistors) and diodes.

The mutual inductor used in the DC-DC converter may have a mutual inductance coefficient larger than 0.5. The primary stage and the secondary stage each have an inductance larger than or equal to 10 nH, and a parasitic resistance smaller than or equal to 1 MΩ.

The operation of the entire circuit (in one charging period for example) will be described as follows. First, the electronic switches $J_1$ and $J_2$ are both off and the TENG charges the temporary storage capacitor via a bridge rectifier circuit. Second, when the voltage of the temporary storage capacitor reaches a predetermined value $V_1$, the control circuit controls to turn on the switch $J_1$ and the voltage of the temporary storage capacitor starts to drop. Third, when the voltage of the temporary storage capacitor drops below a predetermined value $V_2$ (which is smaller than $V_1$), the control circuit (or controller) controls to turn off the switch $J_1$ and turn on the switch $J_2$. Finally, after the energy in the mutual inductor $L_2$ has been transferred to the final energy storage, the control circuit controls to turn off the switch $J_2$ and one charging period ends.

The temporary energy storage can also be a battery and operate as follows. A square-wave clock signal is generated by the control circuit for controlling on time of the first switch $J_1$ and/or the second switch $J_2$. The first switch $J_1$ and the second switch $J_2$ are both off when an output signal from the control circuit is at a low level. The first switch $J_1$ is turned on when the output signal from the control circuit is at a high level, such that the electrical energy is transferred from the temporary energy storage to the first inductor. The first switch $J_1$ is turned off and the second switch $J_2$ is turned on when the output signal from the control circuit changes from the high level back to the low level, such that the electrical energy is transferred from the first inductor to the energy storage via the second inductor.

The value of $V_1$ can range from 15V to 1000V. The value of $V_2$ can range from 0 to $0.999*V_1$.

The temporary energy storage can include at least a battery. A plurality of batteries can be connected in series or parallel to form a battery pack. The temporary energy storage can have a total voltage of 10V-500V, an internal resistance smaller than or equal to 1 MΩ and a leakage current smaller than or equal to 10 mA. The voltage of the temporary energy storage can be higher than that of the energy storage by a factor of 3-1000.

Figure 3:
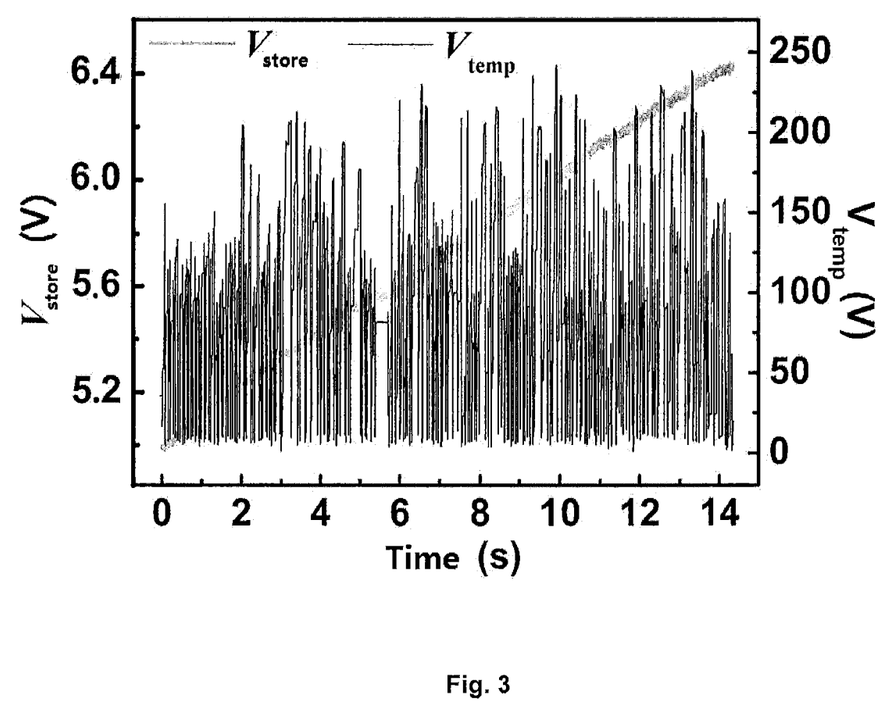
FIG. 3 is a schematic diagram showing a typical operation status of a circuit for energy management in a TENG according to an embodiment of the present disclosure.

The operation status of the entire control circuit is shown in FIG. 3. In FIG. 3, a 15-layer stacked TENG is used as a power source to be collected. When pressed continuously, the TENG generates an AC signal that is inputted to the entire system. At this time, the voltage $V_{temp}$ of the temporary storage capacitor starts oscillating between 230V and 0V. Each time $V_{temp}$ drops, the energy in the temporary storage capacitor can be transferred to the final storage capacitor successfully via the DC-DC converter. In this case, the voltage $V_{store}$ of the storage capacitor rises. By calculation, the energy outputted from the temporary storage capacitor $C_{temp}$ is 9.160 mJ, of which 8.243 mJ is finally stored in the storage capacitor $C_{store}$. Accordingly, the designed DC-DC converter has an energy conversion rate of 90%.

Figure 4A:
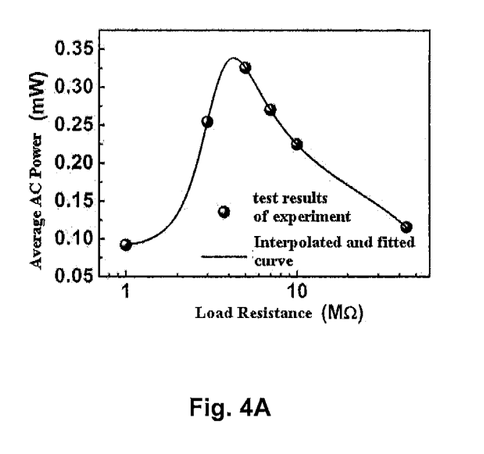
FIGS. 4A and 4B are graphs showing a relationship between an average AC power and a load resistance and a relationship between a measured voltage and time in a circuit for energy management in a TENG according to an embodiment of the present disclosure, respectively.
Figure 4B:
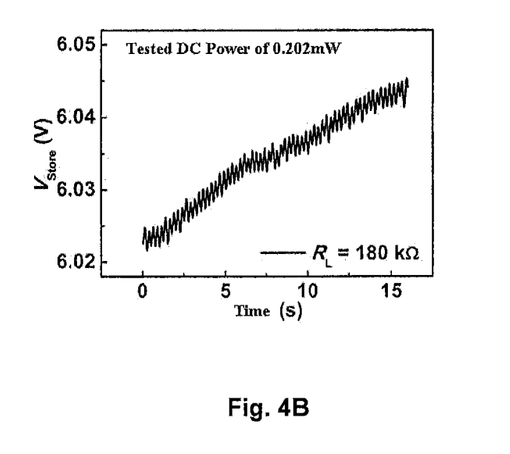

The most important parameter for the entire circuit for energy management is its overall energy conversion rate, which is defined as a DC power the TENG system can output divided by a maximum average AC power that can be outputted on a resistor. The overall energy conversion rate of the circuit for energy management has been tested. The test result is shown in FIGS. 4A and 4B. First, by varying the loaded resistor, it is detected that, with a matched resistance of 4.26 MΩ, the maximum average AC power the TENG can output is 0.3384 mW. In the same setting, with the circuit for energy management, the maximum DC power that can be outputted is 0.202 mW. Accordingly, the overall energy conversion rate $\eta_{total}$ of the circuit can be 60%, which is much higher than the overall energy conversion rate for one-step charging (lower than 1%).

Figure 5:
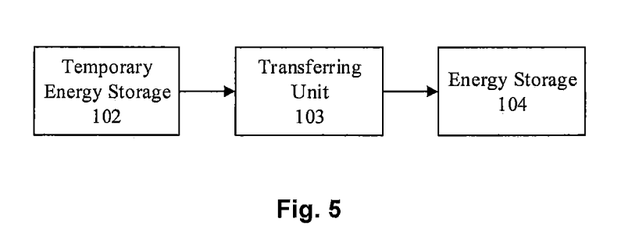
FIG. 5 is a block diagram of an apparatus for energy management in a TENG according to an embodiment of the present disclosure.

FIG. 5 is a block diagram of an apparatus for energy management in a TENG according to an embodiment of the present disclosure. As shown in FIG. 5, an apparatus for energy management in a TENG is provided. The apparatus can include: a temporary energy storage 102 (corresponding to the temporary energy storage of the circuit for energy management) configured to storing electrical energy outputted from the TENG temporarily; a transferring unit 103 (corresponding to the DC-DC converter of the circuit for energy management) configured to transfer the electrical energy stored temporarily in the temporary energy storage to an energy storage; and the energy storage 104 (corresponding to the energy storage of the circuit for energy management) configured to store the electrical energy transferred from the temporary energy storage. With the above solution, the temporary energy storage can be charged and discharged periodically, so as to charge the energy storage. It is possible to achieve impedance match between the TENG and the energy storage and thus a significantly improved energy storage efficiency, such that an AC outputted from the TENG can be converted into a constant-voltage DC output efficiently.

Figure 6:
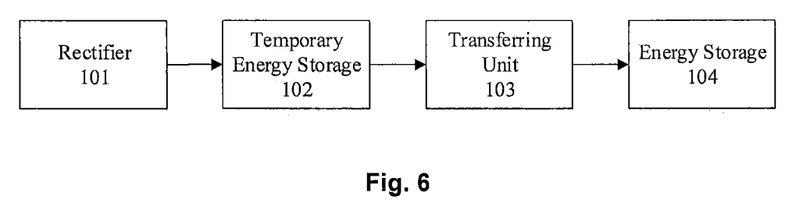
FIG. 6 is a block diagram of an apparatus for energy management in a TENG according to another embodiment of the present disclosure.

In an embodiment, the TENG can include a rectifier configured to convert the alternate electrical energy received from the TENG into a DC output. In a different embodiment, when the TENG has an AC output, the apparatus can include a rectifier 101 (corresponding to the rectifier of the circuit for energy management), as shown in FIG. 6.

In an embodiment, the transferring unit 103 can be further configured to transfer the electrical energy to the energy storage 104 when a voltage of the electrical energy stored temporarily in the temporary energy storage reaches a first predetermined value ($V_1$). The temporary energy storage 102 can be further configured to stop, when transferring the electrical energy to the energy storage 104, transferring the electrical energy to the energy storage 104 when the voltage of the electrical energy stored temporarily in the temporary energy storage reaches a second predetermined value ($V_2$). In this way, the temporary energy storage can be charged and discharged periodically, such that the energy storage 104 can be charged for a number of times. In this case, the value of $V_1$ should be larger than or equal to $V_2$.

The electrical energy stored in the temporary energy storage 102 is DC. In order to transfer or deliver the electrical energy stored in the temporary energy storage 102 to the energy storage 104, the transferring unit 103 can include a DC-DC converter. In an embodiment, the DC-DC converter can include a non-isolated DC-DC converter (including a buck chopper, a boost chopper, or a buck/boost chopper) and an isolated DC-DC converter (including a forward converter, a flyback converter, a half bridge converter, a full bridge converter or a push-pull converter). In a preferred embodiment, the DC-DC converter as used herein can include: a first switch $J_1$; a first inductor $L_1$ being connectable in parallel with the temporary energy storage 102 via the first switch $J_1$; a second switch $J_2$; and a second inductor $L_2$ being connectable in parallel with the energy storage 104 via the second switch $J_2$. The first inductor $L_1$ and the second inductor $L_2$ form mutual inductance.

In an embodiment, the first switch $J_1$ can be turned on when the voltage of the electrical energy stored temporarily in the temporary energy storage 102 reaches the first predetermined value such that the electrical energy is transferred from the temporary energy storage 102 to the first inductor $L_1$. The first switch $J_1$ can be turned off and the second switch $J_2$ can be turned on when the voltage of the electrical energy stored temporarily in the temporary energy storage 102 reaches the second predetermined value, such that the electrical energy is transferred from the first inductor $L_1$ to the energy storage 104 via the second inductor $L_2$. In an embodiment, after the electrical energy has been transferred from $L_2$ to the energy storage 104 and before the voltage of the electrical energy stored temporarily in the temporary energy storage 102 reaches the first predetermined value, the first switch $J_1$ and the second switch $J_2$ should be both off such that the temporary energy storage can accumulate the electrical energy obtained from the rectifier 101 quickly.

In order to achieve a good energy transfer effect, the first inductor $L_1$ and the second inductor $L_2$ can have a mutual inductance coefficient larger than 0.5, an inductance larger than or equal to 10 nH each, and a parasitic resistance smaller than or equal to 1 MΩ each. In an embodiment, the first predetermined value can range from 15V to 1000V, so as to cover a range of commonly used voltages. Meanwhile, in order to allow the entire process for energy transfer to be periodic, the second predetermined value should be lower than the first predetermined value. For example, the range of the second predetermined value $V_2$ can be $0<V_2 \leq V_1$.

In an embodiment, the transferring unit 103 can further include a controller (or a processor) (not shown), which can be coupled to the respective components in the apparatus and can be configured to monitor the voltage(s) of the temporary energy storage 102 and/or the energy storage 104, so as to control the on/off states of the first switch $J_1$ and the second switch $J_2$ according to the principles as described above. In an embodiment, in order to facilitate controlling the states of the switches, the first switch $J_1$ and the second switch $J_2$ can be electronic switches, such as transistors (including various field effect transistors or bipolar transistors) and diodes. In an embodiment, the temporary storage capacitor 102 can be a capacitor of 1 pF-1 mF, e.g., an electrolytic capacitor, a ceramic capacitor or a super capacitor. The energy storage 104 can be a rechargeable battery (including a Lithium-ion battery or a Ni-MH rechargeable battery) or a capacitor (e.g., a super capacitor or an ordinary capacitor) having an internal resistance smaller than or equal to 1MΩ and a leakage current smaller than or equal to 100 mA. The rectifier 101 (or rectifier circuit) can be a diode bridge rectifier or a half wave bridge rectifier.

In an embodiment, the temporary energy storage can also be a battery. A square-wave clock signal is generated by the control circuit for controlling on time of the first switch $J_1$ and/or the second switch $J_2$. The first switch $J_1$ and the second switch $J_2$ are both off when an output signal from the control circuit is at a low level. The first switch $J_1$ is turned on when the output signal from the control circuit is at a high level, such that the electrical energy is transferred from the temporary energy storage to the first inductor. The first switch $J_1$ is turned off and the second switch $J_2$ is turned on when the output signal from the control circuit changes from the high level back to the low level, such that the electrical energy is transferred from the first inductor to the energy storage via the second inductor.

As in the case where the temporary energy storage is a capacitor, after the electrical energy has all been transferred from the second inductor to the energy storage, the second switch $J_2$ is turned off again.

The voltage of the battery is M1 and the voltage of the energy storage is M2. The on/off duty cycle of the first switch $J_1$ and the second switch $J_2$ is an important parameter. A proper duty cycle can be selected based on the ratio between the voltages and the type of the DC-DC converter.

The preferred embodiments of the present disclosure have been described in detail above with reference to the figures. However, the present disclosure is not limited to the above details in the embodiments. Various variants can be made by to the solutions of the present disclosure without departing from the spirits and scope of the present disclosure. These variants are to be encompassed by the scope of the present disclosure. For example, without departing from the principles of the present disclosure, the circuit according to the embodiment of the present disclosure may include additional elements, e.g., resistors, that do not affect the performance of the circuit.

It is also to be noted here that the respective technical features described in the above embodiments can be combined as appropriate given that they do not conflict. Description of various possible combinations will be omitted here for simplicity.

Further, the respective embodiments of the present disclosure can be combined as appropriate without departing from the spirits of the present disclosure, which are to be encompassed by the scope of the present disclosure.

The invention claimed is:

1. A circuit for energy management in a Triboelectric Nanogenerator (TENG), comprising a first stage of circuit and a second stage of circuit connected in parallel with the TENG sequentially,
    wherein the first stage of circuit comprises a temporary energy storage,
    wherein the second stage of circuit comprises a DC-DC converter and an energy storage connected in parallel with each other,
    wherein the DC-DC converter is configured to transfer electrical energy stored in the temporary energy storage to the energy storage, and
    wherein the DC-DC converter is configured to transfer the electrical energy stored temporarily in the temporary energy storage to the energy storage when a voltage of the electrical energy stored temporarily in the temporary energy storage reaches a first predetermined value, and to stop, when transferring the electrical energy, transferring the electrical energy to the energy storage when the voltage of the electrical energy stored temporarily in the temporary energy storage reaches a second predetermined value.

2. The circuit of claim 1, wherein the first stage of circuit further comprises a rectifier configured to rectify electrical energy outputted from the TENG into DC for providing to the temporary energy storage.

3. The circuit of claim 1, wherein the DC-DC converter is a non-isolated DC-DC converter or an isolated DC-DC converter.

4. The circuit of claim 1, wherein the DC-DC converter comprises:
a first switch;
a first inductor connected in parallel with the temporary energy storage via the first switch;
a second switch; and
a second inductor connected in parallel with the energy storage via the second switch,
wherein the first inductor and the second inductor form mutual inductance.

5. The circuit of claim 4,
wherein the first switch and the second switch are both turned off before the voltage of the electrical energy stored temporarily in the temporary energy storage reaches the first predetermined value,
wherein the first switch is turned on when the voltage of the electrical energy stored temporarily in the temporary energy storage reaches the first predetermined value, such that the electrical energy is transferred from the temporary energy storage to the first inductor, and
wherein the first switch is turned off and the second switch is turned on when the voltage of the electrical energy stored temporarily in the temporary energy storage reaches the second predetermined value, such that the electrical energy is transferred from the first inductor to the energy storage via the second inductor.

6. The circuit of claim 5, wherein the second switch is turned off again after the electrical energy has all been transferred from the second inductor to the energy storage.

7. The circuit of claim 1, wherein the second predetermined value is smaller than or equal to the first predetermined value.

8. The circuit of claim 1, wherein the first predetermined value is in a range from 15V to 1000V.

9. The circuit of claim 1, wherein the temporary energy storage is comprises a capacitor of 1 pF-1 mF.

10. The circuit of claim 4,
wherein the temporary energy storage is comprises a battery,
wherein a square-wave clock signal is generated by a control circuit for controlling on time of the first switch and/or the second switch, the first switch and the second switch being both off when an output signal from the control circuit is at a low level,
wherein the first switch is turned on when the output signal from the control circuit is at a high level, such that the electrical energy is transferred from the temporary energy storage to the first inductor, and
wherein the first switch is turned off and the second switch is turned on when the output signal from the control circuit changes from the high level to the low level, such that the electrical energy is transferred from the first inductor to the energy storage via the second inductor.

11. The circuit of claim 10, wherein the temporary energy storage comprises at least a battery which has a total voltage of 10V-500V, an internal resistance smaller than or equal to 1MΩ and a leakage current smaller than or equal to 10 mA.

12. The circuit of claim 10, wherein the voltage of the temporary energy storage is higher than that of the energy storage by a factor of 3-1000.

13. The circuit of claim 4, wherein the first inductor and the second inductor have a mutual inductance coefficient larger than 0.5, an inductance larger than or equal to 10 nH each, and a parasitic resistance smaller than or equal to 1 MΩ each.

14. The circuit of claim 1, wherein the energy storage is a rechargeable battery or capacitor having an internal resistance smaller than or equal to 1MΩ and a leakage current smaller than or equal to 100 mA.

15. The circuit of claim 4, wherein the first switch and the second switch are both electronic switches.

16. An apparatus for energy management in a Triboelectric Nanogenerator (TENG), comprising the circuit according to claim 1.

* * * * *

UNITED STATES PATENT AND TRADEMARK OFFICE
CERTIFICATE OF CORRECTION

PATENT NO. : 10,778,120 B2  
APPLICATION NO. : 15/769605  
DATED : September 15, 2020  
INVENTOR(S) : Niu et al.

Page 1 of 1

It is certified that error appears in the above-identified patent and that said Letters Patent is hereby corrected as shown below:

On the Title Page (30) Foreign Application Priority Data:  
Please correct "2015 1 0679832" to read -- 2015 1 0679832.5 --

In the Claims

Column 12, Line 4, Claim 9:  
Please correct "storage is comprises" to read -- storage comprises --

Column 12, Line 6, Claim 10:  
Please correct "storage is comprises" to read -- storage comprises --

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*